United States Patent
Ivers

(10) Patent No.: US 7,327,384 B2
(45) Date of Patent: Feb. 5, 2008

(54) GAMUT FALSE COLOR DISPLAY

(75) Inventor: Kevin T. Ivers, Woodland, WA (US)

(73) Assignee: Tektronix, Inc., Beaverton, OR (US)

( * ) Notice: Subject to any disclaimer, the term of this patent is extended or adjusted under 35 U.S.C. 154(b) by 470 days.

(21) Appl. No.: 10/600,239

(22) Filed: Jun. 19, 2003

(65) Prior Publication Data

US 2004/0257445 A1 Dec. 23, 2004

(51) Int. Cl.
G09G 5/02 (2006.01)
H04N 17/00 (2006.01)
H04N 17/02 (2006.01)
H04N 9/64 (2006.01)

(52) U.S. Cl. ............ 348/184; 348/177; 348/179; 348/180; 348/615; 348/645; 348/673; 348/678; 348/687; 348/29; 345/590

(58) Field of Classification Search ............ 348/177, 348/179, 180, 184, 661, 615, 644–647, 673–674, 348/678, 687, 29; 345/590
See application file for complete search history.

(56) References Cited

U.S. PATENT DOCUMENTS

| | | | |
|---|---|---|---|
| 4,707,727 A * | 11/1987 | Penney | 348/184 |
| 4,944,578 A * | 7/1990 | Denison | 349/6 |
| 5,311,295 A * | 5/1994 | Tallman et al. | 348/180 |
| 5,450,216 A * | 9/1995 | Kasson | 358/518 |
| 5,487,020 A * | 1/1996 | Long | 382/167 |
| 5,519,440 A * | 5/1996 | Baker | 348/186 |
| 6,069,607 A * | 5/2000 | Everett et al. | 345/660 |
| 6,532,024 B1* | 3/2003 | Everett et al. | 715/716 |
| 6,828,981 B2* | 12/2004 | Richardson | 345/590 |
| 6,954,287 B1* | 10/2005 | Balasubramanian et al. | 358/1.9 |
| 2003/0151694 A1* | 8/2003 | Lee et al. | 348/687 |
| 2004/0046802 A1* | 3/2004 | Wright et al. | 345/810 |
| 2004/0151469 A1* | 8/2004 | Engholm et al. | 386/52 |

* cited by examiner

Primary Examiner—Brian P. Yenke
(74) Attorney, Agent, or Firm—Francis I. Gray; Michael A. Nelson

(57) ABSTRACT

A gamut error false color display uses false coloring on a monochrome image of a video picture being tested. Composite and component gamut error signals are extracted from an input video signal representing the video picture being tested. Such error signals may represent gamut error states corresponding to near out-of-gamut, out-of-gamut high, near out-of-gamut low, out-of-gamut low, etc. A false color display generator has the gamut error signals and a luminance component of the input video signal as inputs and outputs the gamut false color display as the monochrome image with different colors for those pixels in the monochrome image that correspond to the gamut error signals when a gamut error is indicated. Each display component may be tested for gamut errors as well as the video picture as a whole (component or composite). Also either fixed or variable persistence may be used to identify gamut errors over several video pictures in the input video signal. A counter may be used to count the gamut errors detected in order to take a "snapshot" of the gamut error display when a predetermined error limit is reached.

28 Claims, 2 Drawing Sheets

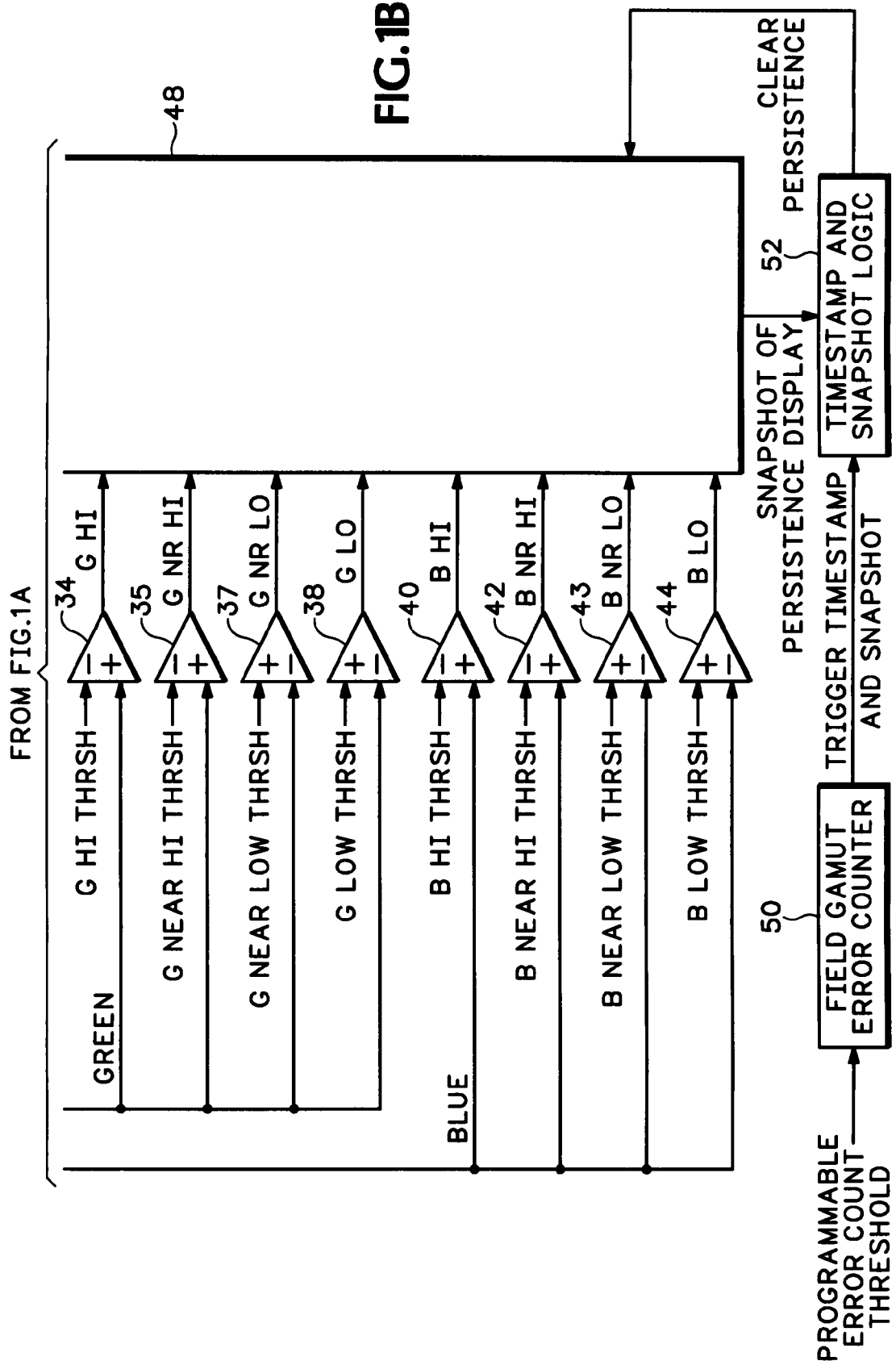

GAMUT FALSE COLOR DISPLAY

BACKGROUND OF THE INVENTION

The present invention relates to video picture analysis, and more particularly to a display format for viewing gamut errors in video pictures being analyzed.

Color video pictures may be represented in several different formats at different times during video processing. The color video pictures may be in an analog composite format, such as NTSC or PAL, in an analog component format, such as Y, $P_b$, $P_r$, in a digital component format, such as SMPTE 125M, in a primary color format, such as RGB, etc. In the course of processing the color video pictures there may be several conversions between the different formats. Each format has a different color space so that it is possible to produce colors in one format that are not reproducible in another format. The inability to reproduce a particular color from one color format in another color format is known as color gamut error.

Additionally analog composite signals usually have certain limits imposed on them for the proper operation of the broadcasting or receiving circuits. Composite signals that exceed a specified signal limit are referred to as having signal limit errors. For simplification color gamut and signal limit errors are referred to as gamut errors herein.

One method of detecting gamut error is disclosed in U.S. Pat. No. 4,707,727 where a color television signal in one format, such as component analog, is converted into a display format, such as primary color. The amplitudes of each component are compared with respective high and low thresholds such that, if either threshold is crossed, an error indication is generated. Such indication may be displayed simply as a light on a panel, or as a blanking, cross-hatching or false coloring on a display. The error indication may also be used to initiate a color correction of the pixels generating the error indication to bring the color of the pixels within gamut, i.e., within the reproducible colors of the new color space. The QA100 quality analyzer manufactured by Pinnacle Systems, Inc. of Mountain View, Calif., originally designed and manufactured by Hewlett-Packard of Palo Alto, Calif., is an example of the use of false coloring of any out-of-gamut pixels, while the WFM700 waveform monitor manufactured by Tektronix, Inc. of Beaverton, Oreg. is an example of overlaying a cross-hatch pattern across out-of-gamut pixels. Both of these methods overlay across normal full color video, and hence make it difficult to see if the gamut error occurs where there is a lot of color, motion, edges, etc., or if the gamut errors themselves occur in small patches.

What is desired is a display of gamut errors that doesn't hide the underlying video picture so it is easier to analyze the cause of the gamut errors.

BRIEF SUMMARY OF THE INVENTION

Accordingly the present invention provides a gamut false color display that uses false coloring on a monochrome image of a video picture being tested. Composite and component gamut error signals are extracted from an input video signal representing the video picture being tested, where monochrome is defined as equal values of Red, Green and Blue, or "no-color." Such error signals may represent gamut error states corresponding to near out-of-gamut, out-of-gamut high, out-of-gamut low, etc. A false color display generator has the gamut error signals and a luminance component of the input video signal as inputs and outputs the gamut false color display as the monochrome image with different colors for those pixels in the monochrome image that correspond to the gamut error signals when a gamut error is indicated. Each display component may be tested for gamut errors as well as the video picture as a whole (component or composite). Also either fixed or variable persistence may be used to identify gamut errors over several video pictures in the input video signal. A counter may be used to count the gamut errors detected in order to take a "snapshot" of the gamut error display when a predetermined error limit is reached.

The objects, advantages and other novel features of the present invention are apparent from the following detailed description when read in conjunction with the appended claims and attached drawing.

DETAILED DESCRIPTION OF THE INVENTION

Figure 1A:
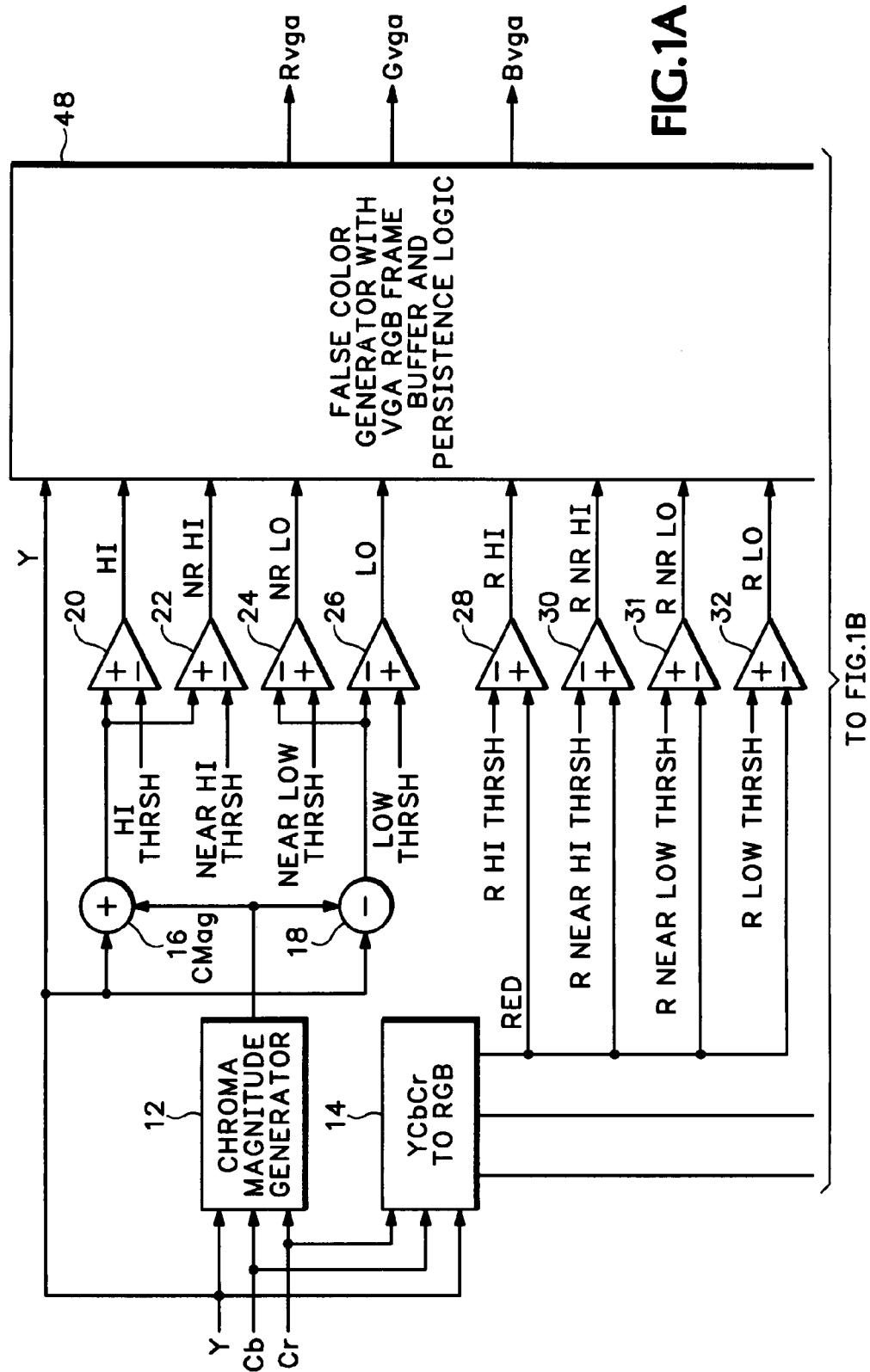
FIG. 1 is a block diagram view of a gamut false color display logic according to the present invention.

Referring now to FIG. 1 an example of the video processing for a video picture signal in one format, such as component video Y, $C_b$, $C_r$, which is converted into a display format, such as primary RGB, and includes gamut error testing is shown. The input video signal is input to a chrominance magnitude generator 12 and a color converter 14. Chrominance components of the input video signal are converted to a chrominance magnitude signal $C_{Mag}$ by the chrominance magnitude generator 12, which chrominance magnitude signal is input to an adder 16 and a subtractor 18. Also input to the adder 16 and subtractor 18 is a luminance component of the input video signal. The output from the adder 16 is input to first and second comparators 20, 22 together with respective high and near high threshold values. The output from the subtractor 18 is input to third and fourth comparators 24, 26 together with respective near low and low threshold values. The outputs from the chrominance comparators 20-26 are boolean values.

The components of the input video signal input to the color converter 14 provide, in this example, three primary color outputs—Red, Green and Blue. Each primary color is input to respective sets of four comparators 28-44 together with respective high, near high, near low and low threshold values. The boolean outputs from the primary color comparators 28-44 as well as the outputs from the chrominance comparators 20-26 are input to a false color display generator 48 that includes a frame buffer.

The video picture being analyzed for gamut errors, as represented by the luminance component Y, is displayed by the false color display generator 48 on a suitable monitor, such as a VGA monitor, in monochrome. The luminance component is used to set the intensity of the display pixel monochrome data. Any portion of the video picture that is close to being out of gamut, as indicated by the boolean values from the chrominance comparators 20-26 and primary color comparators 28-44, is modified with a first color, such as yellow. Any portion of the video picture that is out of gamut low is modified with a second color, such as blue. Finally any portion of the video picture that is out of gamut high is modified with a third color, such as red. In other words if no gamut boolean value is "true", then only monochrome (no-color) is displayed, otherwise the appropriate color is displayed according to which gamut boolean value is "true". The number of different colors used, the particular colors used and the thresholds for their occurrence may be completely programmable. Thus from the high, near high, near low and low boolean values the false color display generator 48 provides the appropriate false color outputs for the display.

The advantage of this gamut false color display format for gamut error detection is that every portion of the video picture may be easily identified as being in gamut, close to being out of gamut, or out of gamut while the content of the video picture is readily discernible. Further knowing the position and effective area of the gamut excursion allows a viewer to gauge the severity of the gamut error. Errors outside of the picture "safe area" (the principal viewing focus area of a video picture—usually the center area), for instance, are less severe than errors inside the safe area. Small or pinpoint gamut errors, even over the entire display screen, are much less severe than concentrated gamut excursions in one area of the screen.

To enhance the usefulness of this display format a variable or fixed persistence may be added to the gamut excursion color, using the frame buffer in the false color display generator 48. The false colors may also have a programmable priority such that lower priority colors do not overwrite higher priority ones. Variable persistence facilitates the detectability of short duration gamut excursions, while fixed persistence allows a gamut test to be applied to an entire video sequence without requiring a person performing the gamut test to be present. Additionally automated capability may be put in place using a field gamut error counter 50 and a timestamp/snapshot logic 52 that takes a snapshot of the gamut display when a large number of gamut excursions has been detected to occur within a field of video. If a snapshot is performed, the persistence is reset.

While displaying the video picture in monochrome, different components of the video picture may be individually tested for gamut errors. For instance only the Red component of the video picture may be checked for RGB gamut errors to produce a false color upon gamut excursion.

Thus the present invention provides a gamut false color display by converting an input video picture signal to a display color format and by separating a chrominance magnitude from luminance in the input video picture signal. The chrominance magnitude is combined with the luminance component and compared with different thresholds to determine composite gamut error, and the display color components are compared also with different thresholds to determine display component gamut error. The boolean values from the comparisons are processed to provide a false color for the display at pixels where the pixels of the input video signal are near to or actually out of gamut, a different false color being used for each gamut error state, otherwise the pixels are displayed in monochrome.

What is claimed is:

1. An apparatus for generating a gamut false color display having a plurality of pixels comprising:
   means for deriving a gamut error signal from an input video signal; and
   means for generating the gamut false color display from the gamut error signal and a luminance component of the input video signal, each pixel being in monochrome except when the gamut error signal indicates a gamut error, in which case a false color is provided in lieu of the monochrome for each pixel associated with the gamut error.

2. The apparatus as recited in claim 1 wherein the deriving means comprises:
   means for generating a chrominance magnitude signal from the input video signal; and
   means for combining the chrominance magnitude signal with the luminance component to produce the gamut error signal.

3. The apparatus as recited in claim 2 wherein the combining means comprises:
   means for additively and subtractively combining the chrominance magnitude signal with the luminance component to produce a composite signal; and
   means for comparing the composite signal with a plurality of threshold values to produce the gamut error signal.

4. The apparatus as recited in claim 1 wherein the deriving means comprises:
   means for converting the input video signal into a plurality of component signals; and
   means for comparing the component signals with a plurality of threshold values to produce the gamut error signal.

5. The apparatus as recited in claim 1 wherein the deriving means comprises:
   means for converting the input video signal into a plurality of component signals; and
   means for comparing a selected one of the component signals with a plurality of threshold values to produce the gamut error signal.

6. The apparatus as recited in claim 1 further comprising means for capturing a portion of the input video signal in response to the gamut error.

7. The apparatus as recited in claim 6 wherein the capturing means comprises means for timestamping the portion.

8. The apparatus as recited in claim 6 further comprising means for counting a number of gamut errors within the portion to produce a gamut error count such that the portion is captured by the capturing means when the gamut error count exceeds a specified value.

9. The apparatus as recited in claims 3, 4 or 5 wherein the plurality of threshold values are selected from the group consisting of a near high gamut error value, a high gamut error value, a near low gamut error value and a low gamut error value.

10. The apparatus as recited in claim 9 wherein the false color comprises a first color for a gamut error high state, a second color for a gamut error near high or near low state and a third color for a gamut error low state, the first, second and third colors being different from monochrome.

11. The apparatus as recited in claim 6 further comprising means for providing persistence for the portion.

12. The apparatus as recited in claim 11 wherein the persistence is variable.

13. The apparatus as recited in claim 12 wherein the persistence is fixed.

14. The apparatus as recited in claims 11, 12 or 13 wherein the persistence is reset when the portion is captured.

15. A method of generating a gamut false color display having a plurality of pixels comprising the steps of:
   deriving a gamut error signal from an input video signal; and
   generating the gamut false color display from the gamut error signal and a luminance component of the input video signal, each pixel being in monochrome except when the gamut error signal indicates a gamut error, in which case a false color is provided in lieu of the monochrome for each pixel associated with the gamut error.

16. The method as recited in claim 15 wherein the deriving step comprises the steps of:
  generating a chrominance magnitude signal from the input video signal; and
  combining the chrominance magnitude signal with the luminance component to produce the gamut error signal.

17. The method as recited in claim 16 wherein the combining means comprises the steps of:
  additively and subtractively combining the chrominance magnitude signal with the luminance component to produce a composite signal; and
  comparing the composite signal with a plurality of threshold values to produce the gamut error signal.

18. The method as recited in claim 15 wherein the deriving step comprises the steps of:
  converting the input video signal into a plurality of component signals; and
  comparing the component signals with a plurality of threshold values to produce the gamut error signal.

19. The method as recited in claim 15 wherein the deriving step comprises the steps of:
  converting the input video signal into a plurality of component signals; and
  comparing a selected one of the component signals with a plurality of threshold values to produce the gamut error signal.

20. The method as recited in claim 15 further comprising the step of capturing a portion of the input video signal in response to the gamut error.

21. The method as recited in claim 20 wherein the capturing step comprises the step of timestamping the portion.

22. The method as recited in claim 20 further comprising the step of counting a number of gamut errors within the portion to produce a gamut error count such that the portion is captured by the capturing step when the gamut error count exceeds a specified value.

23. The method as recited in claims 17, 18 or 19 wherein the plurality of threshold values are selected from the group consisting of a near high gamut error value, a high gamut error value, a near low gamut error value and a low gamut error value.

24. The method as recited in claim 23 wherein the false color comprises a first color for a gamut error high state, a second color for a gamut error near high or near low state and a third color for a gamut error low state, the first, second and third colors being different from monochrome.

25. The method as recited in claim 20 further comprising the step of providing persistence for the portion.

26. The method as recited in claim 25 wherein the persistence is variable.

27. The method as recited in claim 25 wherein the persistence is fixed.

28. The method as recited in claims 25, 26 or 27 wherein the persistence is reset when the portion is captured.

* * * * *